United States Patent
Roby

(10) Patent No.: US 7,190,768 B2
(45) Date of Patent: Mar. 13, 2007

(54) METHOD AND APPARATUS FOR HUMAN-ASSISTED ADAPTIVE OUTBOUND TELEPHONE CALL CLASSIFICATION BASED ON PATTERN RECOGNITION

(75) Inventor: Paul Vinton Roby, Seattle, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 10/224,718

(22) Filed: Aug. 20, 2002

(65) Prior Publication Data

US 2004/0037397 A1   Feb. 26, 2004

(51) Int. Cl.
*H04M 1/64*   (2006.01)

(52) U.S. Cl. .................... 379/70; 379/88.22; 379/88.01

(58) Field of Classification Search ............... 379/67.1, 379/68, 69, 88.01–88.02, 265.02, 92.01–92.04, 379/243, 244; 704/243, 244
See application file for complete search history.

(56) References Cited

U.S. PATENT DOCUMENTS

| | | | | |
|---|---|---|---|---|
| 4,941,168 A | * | 7/1990 | Kelly, Jr. ...................... 379/69 |
| 5,533,103 A | * | 7/1996 | Peavey et al. ................ 379/69 |
| 5,535,269 A | * | 7/1996 | Hamada ...................... 379/233 |
| 5,644,625 A | * | 7/1997 | Solot ........................ 379/88.22 |
| 5,732,132 A | * | 3/1998 | Hamada ...................... 379/354 |
| 5,781,616 A | * | 7/1998 | Youngs et al. ............. 379/88.01 |
| 5,822,405 A | * | 10/1998 | Astarabadi ............... 379/88.04 |
| 5,828,731 A | * | 10/1998 | Szlam et al. .............. 379/88.16 |
| 5,892,820 A | * | 4/1999 | Armstrong et al. .... 379/213.01 |
| 6,041,116 A | * | 3/2000 | Meyers ........................ 379/244 |
| 6,104,786 A | * | 8/2000 | Gibilisco et al. ........ 379/88.23 |
| 6,192,110 B1 | * | 2/2001 | Abella et al. ............. 379/88.01 |
| 6,195,417 B1 | * | 2/2001 | Dans .......................... 379/67.1 |
| 6,208,970 B1 | * | 3/2001 | Ramanan ..................... 704/270 |
| 6,351,636 B2 | * | 2/2002 | Shaffer et al. ........... 455/414.1 |
| 6,470,077 B1 | * | 10/2002 | Chan ........................ 379/88.01 |
| 6,804,331 B1 | * | 10/2004 | Vacek et al. ............. 379/88.02 |
| 2005/0232410 A1 | * | 10/2005 | Gonzalez ............... 379/266.08 |

OTHER PUBLICATIONS

IBM Corp., Technical Disclosure Bulletin, entitled Method for Automatic Directory Update upon Encounter of Specific Callee Messages, vol. 37, No. 01, Jan. 1994, p. No. 391.

* cited by examiner

*Primary Examiner*—Fan Tsang
*Assistant Examiner*—Joseph T Phan
(74) *Attorney, Agent, or Firm*—Sheridan Ross P.C.

(57) ABSTRACT

A system for classifying outbound telephone calls is provided. According to the invention, voice messages received as a result of placing outbound telephone calls can be classified. In particular, autovoice messages, including network intercept messages, can be detected even in the absence of a special information tone. Furthermore, the present invention allows for the initial classification of voice messages to be performed by human operators, with subsequent recognition of classified messages by automated systems. Appropriate responses to recognized voice messages can be performed in substantially real time with dialer operations, or during subsequent dialer operations.

55 Claims, 3 Drawing Sheets

METHOD AND APPARATUS FOR HUMAN-ASSISTED ADAPTIVE OUTBOUND TELEPHONE CALL CLASSIFICATION BASED ON PATTERN RECOGNITION

FIELD OF THE INVENTION

The present invention is directed to the classification of outbound telephone calls. In particular, the present invention is directed to classifying auto voice messages that are detected in response to outbound telephone calls.

BACKGROUND OF THE INVENTION

Enterprises and government agencies increasingly rely on automated or predictive dialing systems for initiating communications with individuals. In particular, such systems can be used to automatically initiate outbound telephone calls. If a live person answering the telephone call is detected, a voice communication link is established between an agent associated with the enterprise or agency and the called party. If a voice mail system or answering machine is detected at the dialed number, the call may be terminated, or a prerecorded message left on the voice mail or answering machine. In order to increase the accuracy and efficiency of such systems, it is desirable to detect network intercept messages, such as operator intercept messages, which may include, for example, a notification that the dialed number has been disconnected or changed.

Telephone communication systems have relied on special tones to pass signals between interconnected pieces of equipment. For example, network intercept messages have typically been prefaced with a standardized special information tone (SIT) sequence notifying a calling piece of equipment that a telephone company or network intercept message follows. Accordingly, the SIT sequence allows network intercept messages to be distinguished from a private customer's voice mail answering machine. Communication systems for initiating telephone communications, such as automated or predictive dialing systems, can utilize SIT tones to classify the results of an outbound telephone call. In particular, such systems can mark a called number that resulted in the receipt of a special information tone for further investigation to determine, for example, the particular operator intercept message associated with the SIT sequence. Such messages may include notifications that the called number has been disconnected or changed. In addition, if an SIT sequence is not received, the communication system can classify the results of an outbound telephone call that results in the receipt of an automated voice (i.e. a non "hello" voice) as a private answering machine. A later attempt at reaching a live person at the dialed number can then be made.

Increasingly, and in particular with the increasing number of independent companies providing wireline and wireless telephony services, standardized SIT sequences are not provided as a preface to operator intercept messages. This reduces the accuracy and efficiency of outbound dialing systems. In addition, products are now available to consumers that mimic SIT sequences in an attempt to thwart attempts by solicitors and collection agencies to contact consumers. Accordingly, the ability of automated dialing systems to rely on the existence or veracity of SIT sequences to classify calls has been severely limited. At the same time, the need to accurately classify outbound calls has increased. In particular, consumer protection laws increasingly require that enterprises attempting to contact individual consumers obey consumers' instructions regarding how they can be contacted. In addition, failing to properly recognize a disconnected or changed number can result in wasted resources, and can result in a missed opportunity to update calling records.

Proposed solutions for classifying outbound calls without relying on the receipt of an SIT sequence include using automated speech recognition (ASR) and intelligent natural language processing (NLP) to recognize, parse and automatically respond to network messages. In an ASR based system, a message is parsed to determine what words have been spoken. An appropriate response may then be taken, provided that the spoken words are accurately recognized and the words match a preprogramed sequence. In an approach utilizing NLP, the spoken words are further analyzed to determine their meaning. If that meaning is accurately discerned, the call can be accurately classified. However, both ASR and NLP based systems require significant processing power, and have been considered unreliable. Additionally, a solution must be developed for each language in which the ASR or NLP system is implemented, and the processing requirements may be too intensive for deployment in connection with existing automated dialing systems or for cost effective deployment in newly developed systems.

SUMMARY OF THE INVENTION

The present invention is directed to solving these and other problems and disadvantages of the prior art. According to the present invention, voice pattern data is extracted from automated (i.e. autovoice or non "hello") voice responses received as the result of placing a telephone call. The extracted voice pattern data is then compared to voice pattern data previously categorized and stored in a database. If a match is found, the received voice pattern data is known, and a response procedure associated with the known, matching voice pattern is performed.

If the voice pattern is not known (i.e. it cannot be matched to a previously categorized and stored voice pattern), the voice pattern, number called and a sound recording of the non "hello" voice are stored in a candidate database. Periodically, the candidate database is searched for duplicate pattern data associated with different called numbers. When matches are found, an agent scripts appropriate responses to the voice pattern. In accordance with an embodiment of the present invention, the agent is a human operator. The database of known voice pattern data is then updated to include the matched voice pattern data from the candidate database and the scripts prepared by the agent for responding to the voice pattern data.

In accordance with an embodiment of the present invention, the voice pattern data is obtained using automated speech recognition (ASR) techniques. For example, received voice pattern data is represented as a series of characters. In accordance with another embodiment of the present invention, the agent used to script appropriate responses to the sounds from which voice pattern data has been extracted comprises an automated agent, for example using natural language processing (NLP) techniques.

In accordance with another embodiment of the present invention, upon detection of a non "hello" voice message, a sound recording of the voice message, call record identification and number called are stored on a database. The outbound telephone call is then terminated, releasing the line for re-use by the autodialer that originally placed the call. The sound recording and call data may then be retrieved from the database, and pattern data extracted. The extracted pattern data may then be compared to known voice pattern data stored on another database. If the voice pattern data is known (i.e. a match is found between the extracted voice pattern data and the known voice pattern data) the call is classified as auto voice or under some other completion code. Follow up calling appropriate to the classification of the call is then scheduled. If the extracted voice pattern is not known, the pattern, number called and sound recording of the non "hello" voice received as a result of the call are placed on a candidate database. Periodically, the candidate database is searched for duplicate voice pattern data associated with different called numbers. Where matches are found, an agent scripts appropriate responses to the sounds included in the sound recording. The agent may be a human operator. The newly classified known voice patterns and scripted responses are then stored in the database containing the known voice pattern data.

These and other advantages and features of the invention will become more apparent from the following description of the invention taken together with the drawings.

DETAILED DESCRIPTION

The present invention is directed to the classification of outbound telephone calls.

Figure 1:
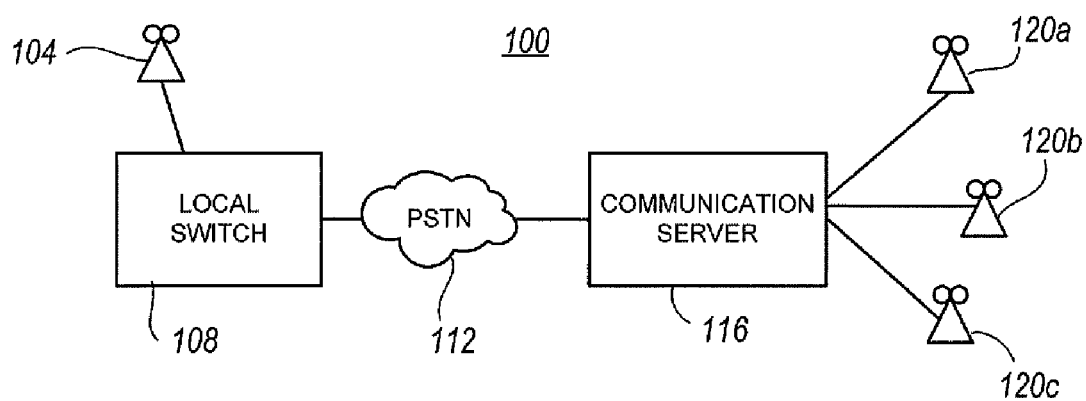
FIG. 1 is a block diagram depicting a communication system in accordance with an embodiment of the present invention.

FIG. 1 is a block diagram of a communication system 100 in accordance with an embodiment of the present invention. In general, the communication system 100 includes a called or target telephone or device 104 interconnected to a local switch 108. As can be appreciated, the called telephone or device 104 may comprise a conventional telephone and/or a telephone answering device, for example located on the premises of a called party. The local switch 108 may comprise a local telephone company switching infrastructure, or a private branch exchange (PBX). In addition, it should be appreciated that the local switch 108 may be capable of providing operator intercept messages or other network intercept messages (NIMs).

As shown in FIG. 1, the local switch 108 may be interconnected to the public switched telephony network (PSTN) 112. The public switched telephony network 112 is in turn interconnected to a communication server 116. As can be appreciated, for example where the local switch 108 and the communication server 116 are local (e.g., in close proximity to one another or part of a closely interconnected communication system) the local switch 108 may be directly connected to the communication server 116.

The communication server 116 generally provides communication services, and in particular outbound automated or predictive dialing services. As shown in FIG. 1, the communication server 116 is generally connected to an agent communication device 120. Furthermore, as illustrated in FIG. 1, the communication server 116 is typically interconnected to a plurality of agent communication devices 120 (e.g., communication devices 120a–c) that are used by agents to communicate with called parties at the called communication device 104 when the communication server 116 is interconnected to a live voice at the called communication device 104. An agent communication device 120 may comprise a telephone. An agent communication device 120 may also comprise a soft telephone implemented as part of a general purpose computer, such as a PC computer. As yet another example, a communication device 120 may comprise a telephone operated in connection with a general purpose computer.

Figure 2:
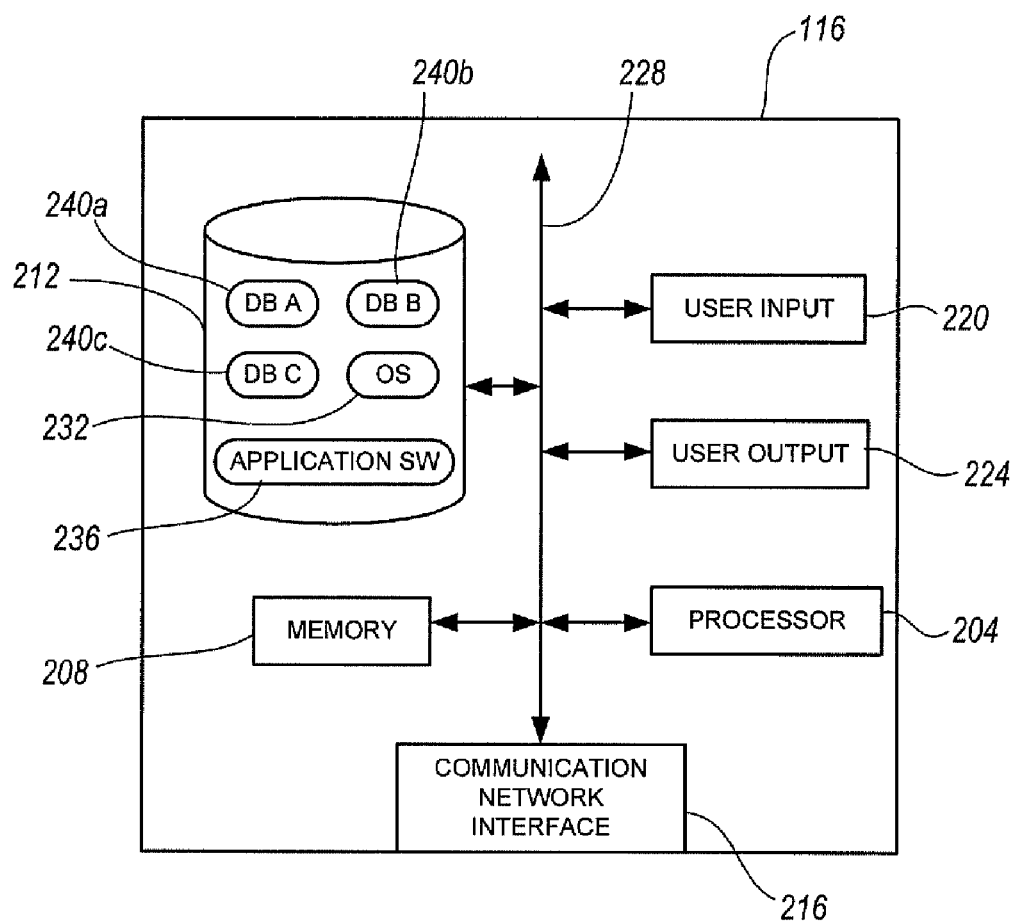
FIG. 2 is a block diagram depicting a communication server in accordance with an embodiment of the present invention.

With reference now to FIG. 2, a communication server 116 in accordance with an embodiment of the present invention is illustrated in block diagram form. In general, the communication server 116 includes a processor 204, memory 208, computer data storage 212, and a communication network interface 216. In addition, the communication server 116 generally includes one or more user input devices 220 and one or more user output devices 224. The various components 204–228 of the communication server 116 are generally in communication with one another over a communication bus 228. In accordance with an embodiment of the present invention, the communication server 116 comprises an AVAYA™ PREDICTIVE DIALING SYSTEM.

The processor 204 may include any general purpose programmable processor, such as a Pentium™ processor. Furthermore, multiple processors 204 may be included in the communication server 116. The memory 208 may include any memory device or devices suitable for storing computer data. For example, the memory 208 may comprise DRAM or SDRAM. The computer storage device 212 may comprise one or more devices suitable for the storage of computer data. For example, the computer data storage 212 may include one or more hard disk drives, magnetic tape drives, and/or optical storage devices.

The communication network interface 216 provides an interface between the communication server 116 and the interconnected communication network, such as the public switched telephony network 112 or a network intermediate to the public switched telephony network 112 and the communication server 116. Accordingly, the communication network interface 216 may comprise a tip and ring communication interface for use in connection with a switched circuit network, or a TCP/IP interface for use in connection with a packet data network. Furthermore, it should be appreciated that the communication network interface 216 may interconnect the communication server 116 to both a switched circuit network and a packet data network. For example, the communication network interface 216 may comprise a switched circuit interface and a separate packet data network interface. Furthermore, the agent communication device or devices 120 can be interconnected to the communication server 116 through the communication network interface 216.

The user input 220 may comprise one or more devices for receiving input from a human operator. For example, the user input 220 may include a keyboard, or a pointing device. In addition, the user input 220 may include a microphone. The user output 224 may comprise any device suitable for conveying information to a human operator. For example, the user output 224 may comprise a cathode ray tube, a flat panel (e.g., liquid crystal) display, and/or a speaker.

With continued reference to FIG. 2, various programs and data may be stored on the computer data storage device 212. For example, an operating system 232 may be stored in the computer data storage 212. In addition, various application software 236 may be stored on the computer data storage 212. The application software 236 may include software implementing the method of the present invention, and software implementing predictive dialing functions performed by the communication server 116. In addition, one or more databases 240 may be stored on the computer data storage 212.

Figure 3:
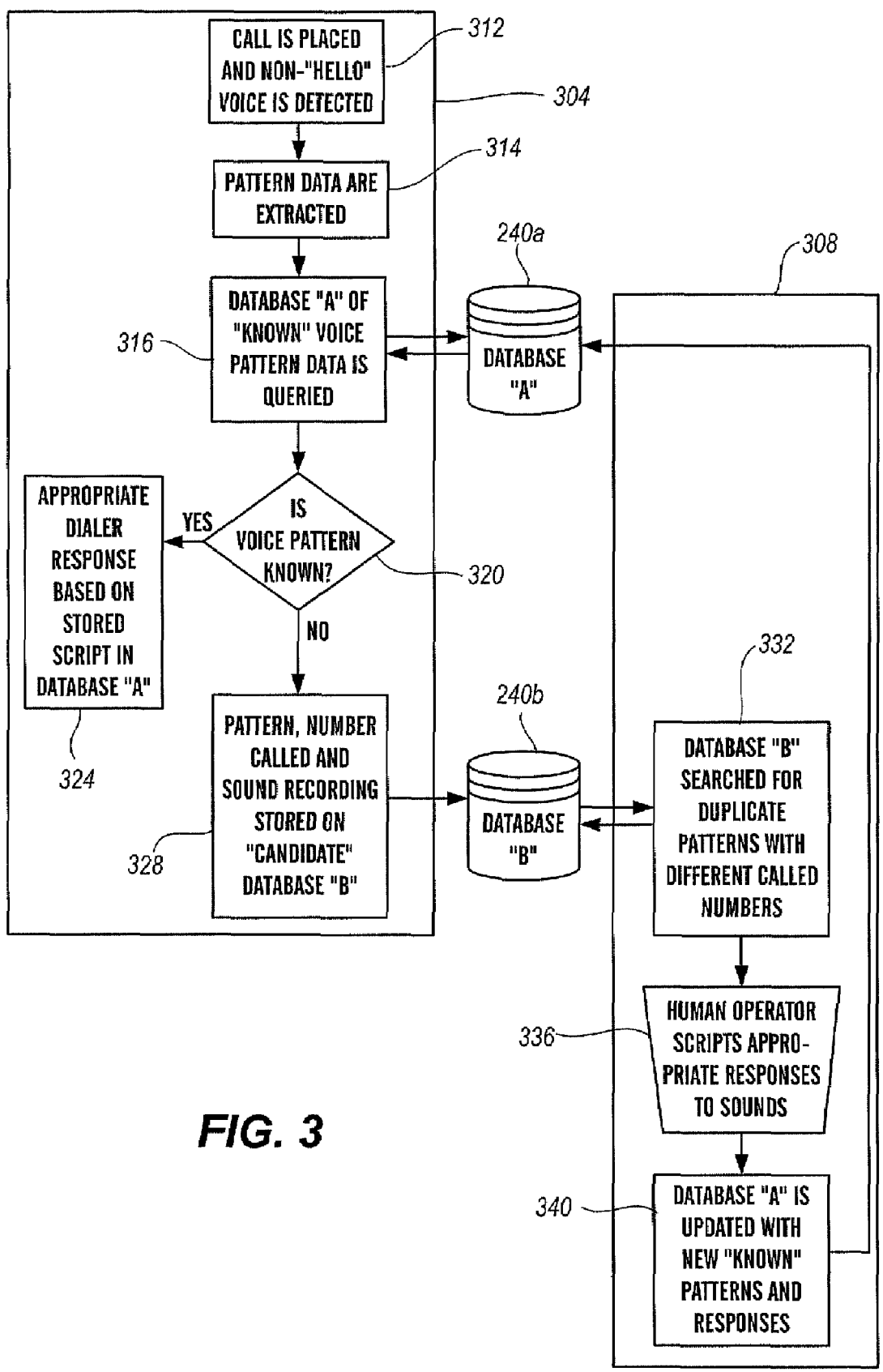
FIG. 3 is a flow chart depicting the operation of an outbound telephone call classification system in accordance with an embodiment of the present invention.

With reference now to FIG. 3, the operation of a communication server 116 in accordance with an embodiment of the present invention is illustrated. In general, the steps taken by the communication server 116 in the embodiment illustrated in FIG. 3 can be divided into a dialer operation process 304 and an update process 308.

The steps included in the dialer operation process 304 include placing a telephone call and detecting a non "hello" voice 312. As can be appreciated by one of skill in the art, the call may be placed according to predictive dialing strategies implemented by the communication server 116. As can also be appreciated by one of skill in the art, the detection of a non "hello" voice (i.e. a voice message that is not being received from a human in real time) can be performed using various known strategies. Next, at step 314, voice pattern data is extracted from the received non "hello" voice. In general, the extraction of voice pattern data may comprise representing the received voice message as a series of textual characters, such as may be performed in connection with automatic speech recognition procedures. However, it should be appreciated that the present invention does not require that the algorithm used to convert the received voice information into voice pattern data be provided in connection with an algorithm that is capable of accurately associating the extracted voice pattern data with natural language words. Instead, the engine used to extract the voice pattern data should merely be capable of consistently converting voice data into textual data (or binary data). In accordance with an embodiment of the present invention, spoken numerals are not included in the extracted voice pattern data. This allows messages that refer to the dialed number and/or to a new number that has replaced the called number to be recognized generically.

At step 316, a database (e.g., database A 240a) of known voice pattern data is queried, and a determination is made as to whether the received voice pattern, as represented by the extracted pattern data, is "known" (step 320). In particular, a determination is made as to whether the extracted voice pattern data matches known pattern data stored in the database 240a. A match may be found if all or portions of the extracted voice pattern data matches known voice pattern data.

If the extracted pattern data matches known voice pattern data, and is therefore itself known, the automated dialer (i.e. the communication server) responds based on a script associated with the known voice pattern data (step 324). The script that determines the response of the communication server 116 may be stored in the database with the known voice pattern data.

If at step 320 it is determined that the extracted voice pattern data does not correspond to any known voice pattern data, the extracted voice pattern data, the telephone number called and a sound recording of the non "hello" voice message is stored on a "candidate" database (e.g. database B 240b) (step 328).

The steps included in the update process 308 generally analyze the extracted voice pattern data stored on the "candidate" database 240b, and the results of that analysis may be used to populate the database of "known" voice pattern data (database 240a). In particular, at step 332, the candidate database 240b is searched for duplicate extracted voice pattern data associated with different called numbers. By finding matching pattern data that originated from different called numbers, instances of voice pattern data that are not unique to a called number can be located. In particular, this allows operator intercept or other network intercept messages to be identified, even if the voice messages were not preceded by a special information tone (SIT) sequence. Furthermore, by looking for duplicated extracted voice pattern data associated with different called numbers, the analysis of voice messages originating from a single number that has been dialed multiple times can be avoided.

At step 336, an agent scripts appropriate responses to a duplicated voice message. In accordance with an embodiment of the present invention, the agent comprises a human operator listening to the sound recording of the voice message that has been stored on the "candidate" database 240b, together with the extracted voice pattern data and information regarding the called number. In accordance with another embodiment of the present invention, the agent comprises an automatic speech recognition (ASR) or intelligent natural language processing (NLP) system. The response that is scripted allows the communication server 116 to appropriately respond to an associated voice message in subsequent calls. Examples of scripted responses include recording a portion of the voice message that is unique to the called number and that identifies a number that has replaced the called number to allow the communication server's 116 automatic dialing system to be updated with the new information. Another example of a scripted response includes placing the dialed number on a do not call list, for example in response to a voice message indicating that the party associated with the dialed number does not wish to receive telephone calls from solicitors. Still another example of a scripted response includes updating a database of telephone numbers maintained in connection with the communication server 116 to indicate that a called number has been disconnected, for example in response to a voice message indicating that the called number is no longer in service.

At step 340, the database of "known" voice pattern data 240a is updated to include the new known voice pattern data identified at step 332 and the associated responses scripted at step 336. Accordingly, the next time that an outbound telephone call results in the receipt of a voice message comprising the newly added "known" voice pattern data, the communication server 116 can respond as directed by the scripted response (step 324). In accordance with an embodiment of the present invention, the known voice pattern database contains only those portions of the applicable voice message that have general applicability. For example, portions of the message related to a particular called number may not be included in the voice patterns stored as voice pattern data.

It should be appreciated that the update process 308 need not be performed in synchronization with the steps taken during dialer operation 304. In particular, the use of a candidate database 240b allows voice pattern data extracted from voice messages received in connection with a number of outgoing telephone calls to be collected. The contents of the "candidate" database 240b may then be analyzed when it is convenient for an agent, such as a human operator, to do so. For example, the candidate database 240b may be searched periodically, for example daily, or when a certain amount of data has been collected.

As can also be appreciated not every instance of voice pattern data extracted from a voice message must be analyzed by an agent. Instead, only that voice pattern data that is found to match at least one other instance of voice pattern data is analyzed.

Figure 4:
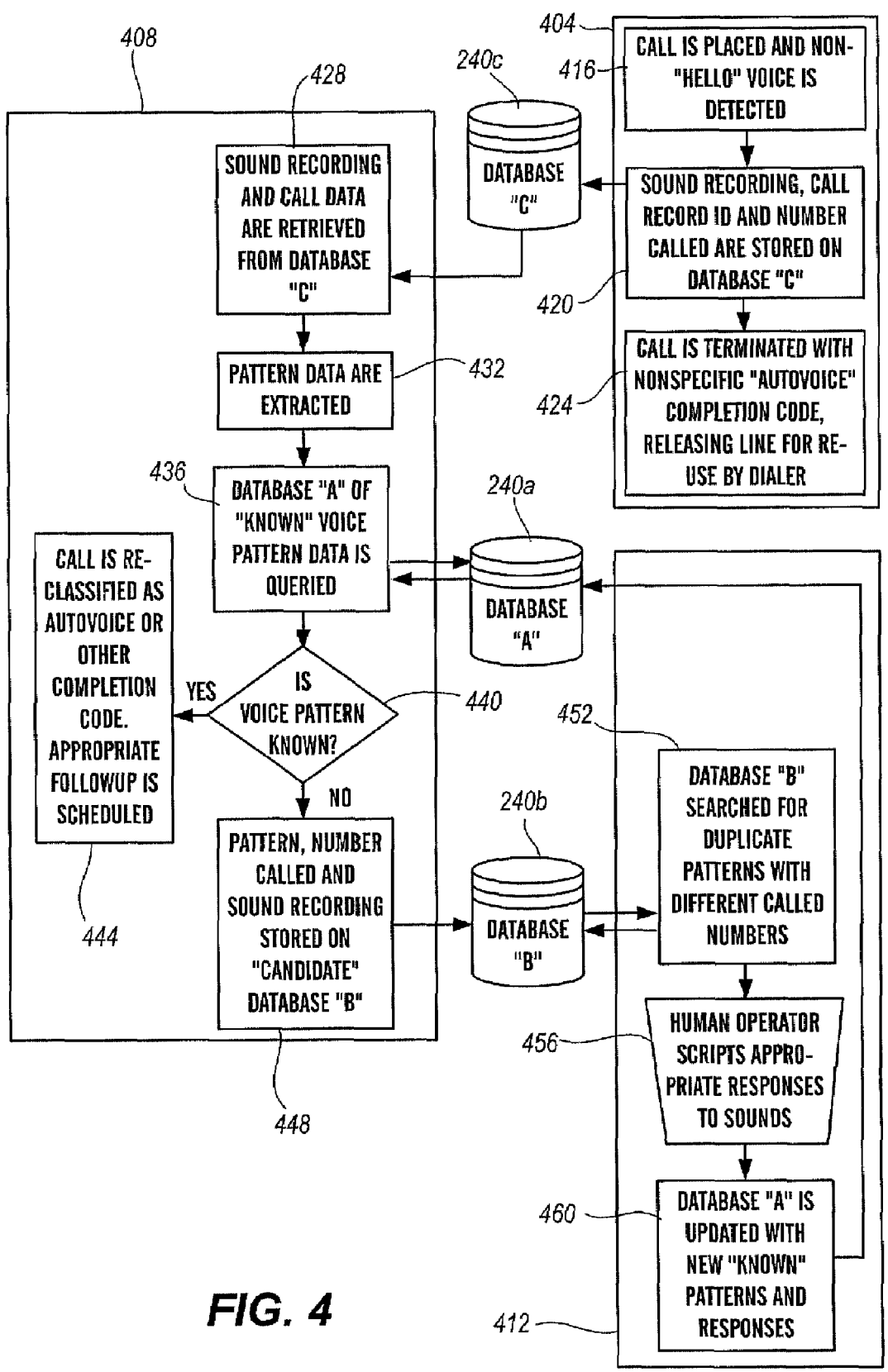
FIG. 4 is a flow chart depicting the operation of an outbound telephone call classification system in accordance with another embodiment of the present invention.

With reference now to FIG. 4, the operation of a communication server 116 in accordance with another embodiment of the present invention is illustrated. In general, the embodiment illustrated in FIG. 4 performs operations that can be divided into dialer operations 404, pattern matching operations 408, and update operations 412.

The dialer operations 404 initiate when a call is placed and a non "hello" voice is detected (step 416). The detection of a non "hello" voice may be performed using techniques known to those of skill in the art. At step 420, a sound recording of the non "hello" voice message is made, and the sound recording, together with call record identification and the number dialed, are stored in a call record database 240c (step 420). The call is then terminated with a non-specific "auto voice" completion code, releasing the line for re-use by the dialer associated with the communication server 116 (step 424). Accordingly, additional calls may then be placed using the line.

The pattern matching operations 408 begin by retrieving the sound recording and call data from the database 240c (step 428). Voice pattern data may then be extracted from the sound recording (step 432). The extraction of voice pattern data may utilize techniques for converting sound patterns to textual or other characters that are used in connection with automatic speech recognition.

At step 436, a database 240a of "known" voice pattern data is queried to determine whether the extracted pattern data matches a known voice pattern. This determination is made at step 440. If the extracted pattern data matches known voice pattern data from the database 240a, and is therefore itself known, the call is reclassified as auto voice or under some other completion code (step 444). Appropriate follow up action is then scheduled. For example, a previously dialed number associated with the known voice pattern data may be placed on a do not call list. As a further example, a new telephone number associated with a known voice message indicating that a dialed number has been changed may replace the originally dialed number in the dialer of the communication server 116, and a call to the new number can be scheduled.

If the voice pattern data is not "known" (i.e. it cannot be matched to any voice pattern stored in the database 240a), the extracted pattern data, number called and sound recording are stored on the candidate database 240b (step 448).

After data has been stored on the "candidate" database 240b, the update process 412 can be performed. Initially, the candidate database 240b is searched for duplicate extracted voice patterns having different called numbers (step 452). Messages having duplicate voice data patterns associated with different called numbers are then provided to an agent so that appropriate responses to the voice messages can be scripted (step 456). In accordance with an embodiment of the present invention, the agent is a human operator who listens to the sound recording of the voice message, and who scripts an appropriate response for association with the voice pattern data extracted from the voice message. Next, at step 460, the known voice pattern data database 240a is updated to include the newly identified known voice pattern data and scripted response.

It should be appreciated that the dialer operations 404, the pattern matching operations 408, and the update processes 412 may be performed asynchronously. Furthermore, it should be appreciated that the embodiment of the present invention illustrated in FIG. 4 allows appropriate follow up action with respect to a dialed number, even if such follow up action cannot be determined while the communication server 116 is in communication with the communication device 104 at the dialed number or the local switch 108 associated with the dialed number. Therefore, the embodiment illustrated in FIG. 4 allows appropriate responses to operator intercept and other network intercept messages to be taken, without requiring the delays that might be associated with determining an appropriate response while the connection is maintained. In addition, the embodiment illustrated in FIG. 4 can quickly free up outbound communication lines, to enable the communication server 116 to proceed with dialing other telephone numbers with reduced delay.

As noted above, the present invention allows a human operator to classify the voice message encountered during outbound calling operations. Accordingly, embodiments utilizing a human agent are capable of classifying voice messages with an accuracy that cannot be easily achieved at present using available automated technology. The present invention increases the efficiency with which a human can classify voice messages, by presenting only those voice messages that are found to match other voice messages. That is, the present invention provides only those voice messages that are likely the result of an operator intercept or other network intercept message for analysis and classification. Accordingly, the present invention allows pattern matching functions to be performed in connection with computers, a task for which computers are well suited. In addition, the present invention allows for human operators to perform language comprehension functions, a task for which humans are well suited.

In accordance with an embodiment of the present invention, the databases 240 may be maintained by a telecommunication service provider for the benefit of multiple enterprises. According to such an embodiment, the present invention may provide a database of "known" voice pattern data that benefits from the voice messages encountered by a number of enterprises, and thus can be populated more quickly and/or can contain more entries than might be the case if the "known" voice pattern database 240a were maintained by single enterprise. Furthermore, maintenance of the known voice pattern database 240a and the candidate database 240b can be performed by the service provider. The steps of updating 308 the "known" voice pattern database 240a can also be performed by the service provider. In such an embodiment, the dialer operation steps 304 are performed by the individual enterprises, with reference to the databases 240a and 240b that are maintained by the service provider and shared by the subscribing enterprises.

Similarly, the embodiment illustrated in FIG. 4 may be performed in connection with a service provider servicing one or more enterprises. For instance, the steps of pattern matching 408 and of updating 412 can be performed by a service provider on behalf of an enterprise that performs only the steps of dialer operation 404. Alternatively, the enterprise or enterprises may perform the steps of dialer operation 404 and of pattern matching 408, while the service provider performs the steps of updating 412 the "known" database 240a.

In accordance with an embodiment of the present invention, the candidate database 240b can be purged to remove voice pattern data, and the associated sound recording and called number information, that have been stored in the candidate database 240b for a predetermined amount of time and for which a match has not been found. Purge operations may be performed periodically, or after a predetermined amount of data has been collected in the candidate database 240b. Alternatively or in addition, individual voice pattern data and associated information can be purged after the predetermined amount of time has elapsed with respect to the data. The purging of data for which a match has not been found reduces the storage requirements of the candidate database 240b, and generally increases the speed with which searches for matching voice pattern data can be performed. The time period for which data is allowed to persist on the candidate database 240b before a match is found or the data is purged can be adjusted according to the requirements of a particular implementation of the invention. For example, a system in connection with which relatively few outbound calls are made can benefit from a longer time period during which data is allowed to persist on the candidate database, to increase the chance that matching voice pattern data will eventually be found.

As can be appreciated by one of skill in the art, the communication server 116 components and/or functions can be distributed among a number of devices. For example, a first communication server 116 performing automated dialing operations may be used by an enterprise to perform dialer operations 304, 404, a second communication server 116 may be utilized by the service provider for the pattern matching and updating processes 308, 412, and a third communications server 116 may be utilized for implementing one or more of the databases 240. Accordingly, it should be appreciated that the communication server 116 may comprise general purpose server devices and computer data storage devices.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for classifying outbound telephone calls, comprising:
   placing a first telephone call to a first telephone number;
   detecting a first autovoice instance received in response to said first telephone call;
   extracting at least first voice pattern data from said detected first autovoice instance;
   comparing said at least first extracted voice pattern data to at least first known voice pattern data stored in a first database comprising a database of known voice data, wherein said at least first known voice pattern data comprises at least second extracted voice pattern data, and wherein said second extracted voice pattern data is extracted from a second autovoice instance received in response to a second telephone call placed to a second telephone number, wherein said first telephone number is different than said second telephone number;
   in response to a match between said at least first extracted voice pattern data and said at least first known voice pattern data, performing a first predetermined action; and
   in response to a failure to match said at least first extracted voice pattern data to said at least first known voice pattern data, storing said first extracted voice pattern data in a second database comprising a candidate database.

2. The method of claim 1, further comprising:
   after storing said first extracted voice pattern data in said candidate database is response to a failure to match said first extracted voice pattern data to said at least first known voice pattern data, matching said first extracted voice pattern data to third extracted voice pattern data, wherein said third extracted voice pattern data is stored in said candidate database.

3. The method of claim 2, wherein said step of matching said stored first extracted voice pattern data to said stored third extracted voice pattern data comprises comparing said first extracted voice pattern data to said third extracted voice pattern data and matching at least a portion of said first extracted voice pattern data to at least a portion of said third extracted voice pattern data, wherein said third extracted voice pattern data is extracted from a third autovoice instance received in response to a third telephone call placed to a third telephone number, wherein said third telephone number is different than said first and second telephone numbers.

4. The method of claim 3, further comprising:
   in response to matching said at least a portion of said first extracted voice pattern data to at least a portion of said third extracted voice pattern data, scripting a response, wherein said step of scripting is performed by a human operator.

5. The method of claim 1, wherein said step of storing said first extracted voice pattern data further comprises storing a number called and a sound recording corresponding to said first extracted voice pattern data.

6. A computer readable storage medium containing programming code for performing the steps of claim 1.

7. A method for classifying outbound autovoice call terminations, comprising:
   receiving at least first autovoice pattern data in response to a first outgoing telephone call placed to a first telephone number;
   storing said first autovoice pattern data in a candidate database;
   receiving at least second autovoice pattern data in response to a second outgoing telephone call placed to a second telephone number that is different than said first telephone number;
   storing said second autovoice pattern data in said candidate database;
   comparing said at least first received autovoice pattern data to said stored at least second received autovoice pattern data;
   in response to a match between at least a portion of said first received autovoice pattern data and at least a portion of said stored second received autovoice pattern data, scripting a response to said matching portions of said first and second autovoice pattern data; and
   storing said matching portions of said autovoice pattern data and said scripted response in a database of known voice pattern data.

8. The method of claim 7, further comprising:
permitting access to said stored autovoice pattern data and said scripted responses by at least a first party performing outbound dialing operations.

9. The method of claim 7, wherein said at least first autovoice pattern data is received from at least a first party performing outbound dialing operations.

10. An apparatus for classifying outbound telephone calls, comprising:
at least a first computer storage medium;
at least a first computer processor in communication with said at least a first computer storage medium; and
at least a first communication channel interface in communication with said at least a first computer processor, wherein first extracted voice pattern data from a first autovoice instance received at said communication channel interface in response to a call to a first telephone number is compared to second voice pattern data stored on said computer storage medium in a database of known voice pattern data, wherein said second voice pattern data is extracted from a second autovoice instance received at said communication channel interface in response to a call to a second telephone number, wherein a first predetermined response is performed in response to a match between said first extracted voice pattern data and said second extracted voice pattern data, wherein said first extracted voice pattern data is stored on said computer storage medium in a candidate database in response to a failure to match said first extracted voice pattern data to said second extracted voice pattern data, and wherein said first and second telephone numbers are not the same.

11. The apparatus of claim 10, further comprising a second computer storage medium, wherein said first extracted voice pattern data is stored on said second computer storage medium in response to a failure to match said first extracted voice pattern data to said second voice pattern data.

12. The apparatus of claim 10, further comprising:
a user output;
a user input, wherein a human operator is provided with said first extracted voice pattern data and third voice pattern data by said user output, and wherein said operator enters a predetermined response to a match between said third voice pattern data and a received extracted voice pattern data with said user input.

13. The apparatus of claim 10, wherein said first communication channel interface is interconnected to the public switched telephony network.

14. An outgoing call classification apparatus, comprising:
means for placing a call;
means for storing first received voice pattern data comprising a database of known voice pattern data, wherein said first received voice pattern data is received in response to a first call placed to a first telephone number by said means for placing a call;
means for receiving second voice pattern data, wherein said second received voice pattern data is received in response to a second call placed to a second telephone number that is different than said first telephone number by said means for placing a call;
means for comparing said first received voice pattern data to said second received voice pattern data; and
means for storing comprising a candidate database, wherein said second received voice pattern data is stored in said candidate database in response to receiving second voice pattern data that does not match said first received voice pattern data.

15. The apparatus of claim 14, further comprising:
means for comparing said second voice pattern data to third voice pattern data stored in said candidate database;
means for providing at least one of said second voice pattern data and said third voice pattern data to a human operator if said means for comparing matches said second voice pattern data to said third voice pattern data;
means for associating a script prepared by said human operator wit at least a portion of at least one of said second voice pattern data and said third voice pattern data; and
means for providing said script and associated voice pattern data to said means for storing comprising a database of known voice pattern data.

16. A computer readable storage medium carrying instructions for performing a method, the method comprising:
comparing first voice pattern data to stored second voice pattern data stored in a database of known voice pattern data, wherein said first voice pattern data and said second voice pattern data are extracted from voice messages received in response to outgoing telephone calls placed to different telephone numbers;
in response to detecting a match between said first voice pattern data and said second voice pattern data, performing instructions associated with said second voice pattern data; and
in response to failing to detect a match between said first voice pattern data and said second voice pattern data, storing said first voice pattern data in a candidate database.

17. The computer readable storage medium of claim 16, the method further comprising:
comparing said stored lint voice pattern data to stored third voice pattern data stored in said candidate database; and
in response to detecting a match between said stored first voice pattern data and said third stored voice pattern data, providing at least one of at least a portion of said first voice pattern data and at least a portion of said third stored voice pattern data to a scripting agent, whereby instructions for responding to a detected match between compared voice pattern data are prepared.

18. The computer readable storage medium of claim 17, wherein said scripting agent comprises a human operator.

19. The computer readable storage medium of claim 17, the method further comprising:
storing instructions prepared by said scripting agent, wherein said instructions are performed in response to detecting a match between fourth voice pattern data and said third stored voice pattern data.

20. The computer readable storage medium of claim 16, wherein said first voice pattern data is received from a computer storage medium.

21. The computer readable storage medium of claim 16, wherein said first voice pattern data is received from a switched circuit telephony network.

22. The computer readable storage medium of claim 16, wherein said stored second voice pattern data comprises an operator intercept message.

23. The computer readable storage medium of claim 16, the method further comprising:

prior to said step of comparing first voice pattern data to second voice pattern data, detecting first voice pattern data comprising an autovoice.

24. The computer readable storage medium of claim 23, wherein said autovoice comprises at least one of an operator intercept message and a number specific voice response.

25. The computer readable storage medium of claim 16, wherein said first voice pattern data is received as part of a telephone call, and wherein said step of comparing first voice pattern data to stored second voice pattern data is performed before said telephone call is disconnected.

26. The computer readable storage medium of claim 16, the method further comprising:
storing said first voice pattern data, wherein said first voice pattern data is received as part of a telephone call, and wherein said step of comparing first voice pattern data to stored second voice pattern data is performed after said telephone call is disconnected.

27. The method of claim 1, wherein said autovoice is detected in the absence of a special information tone.

28. A method for classifying outbound telephone calls, comprising:
placing first a telephone call to a first telephone number;
detecting a first autovoice in response to said first telephone call, wherein said first autovoice is detected in the absence of a special information tone;
extracting at least first voice pattern data from said detected first autovoice;
placing a second telephone call to a second telephone number, wherein said first and second telephone numbers are different from one another, and wherein said call to said second telephone number is placed before said call to said first telephone number;
detecting a second autovoice in response to said second telephone call;
extracting at least second voice pattern data from said detected second autovoice;
storing said extracted second voice pattern data in a database of known voice pattern data;
comparing said first extracted voice pattern data to said second extracted voice pattern data;
in response to a match between said first extracted voice pattern data and said second extracted voice pattern data, performing a first predetermined action; and
in response to a failure to match said first extracted voice pattern data to said second extracted voice pattern data, storing said first extracted voice pattern data in a candidate database.

29. The method of claim 28, further comprising:
matching said stored first extracted voice pattern data to said second extracted voice pattern data, wherein said performing a first predetermined action includes scripting at least a second predetermined action.

30. The method of claim 29, wherein said step of matching said stored first extracted voice pattern data to said second extracted voice pattern data comprises matching at least a first portion of said first extracted voice pattern data to at least a first portion of said second extracted voice pattern data.

31. The method of claim 29, wherein said step of scripting is performed by a human operator.

32. The method of claim 29, wherein said at least second extracted voice pattern data is retrieved from a database.

33. The method of claim 29, wherein said matched voice pattern data and said at least a second predetermined action are stored in a first database.

34. The method of claim 28, wherein said step of storing said first extracted voice pattern data further comprises storing a number called and a sound recording corresponding to said first extracted voice pattern data.

35. A computer readable storage medium containing programming code for performing the steps of claim 28.

36. A method for classifying outbound autovoice call terminations, comprising:
receiving at least first autovoice pattern data in response to a first telephone call to a first telephone number, wherein a standard special information tone is not received in response to said first telephone call;
receiving at least second autovoice pattern data in response to a second telephone call to a second telephone number, wherein said first and second telephone numbers are different from one another;
comparing said at least first autovoice pattern data to said at least second autovoice pattern data;
in response to a match between at least a portion of said first autovoice pattern data and at least a portion of said second autovoice pattern data, scripting a response to said matching portions of said autovoice pattern data; and
storing said matching portions of said first and second autovoice pattern data and said scripted response.

37. The method of claim 36, further comprising:
permitting access to said stored autovoice pattern data and said scripted responses by at least a first party performing outbound dialing operations.

38. The method of claim 36, wherein said at least first autovoice pattern data is received from at least a first party performing outbound dialing operations.

39. An apparatus for classifying outbound telephone calls, comprising:
at least a first computer storage medium;
at least a first computer processor in communication with said at least a first computer storage medium; and
at least a first communication channel interface in communication with said at least a first computer processor, wherein first extracted voice pattern data from an autovoice received at said communication channel interface in response to a first telephone call to a first telephone number and in the absence of a special information tone is compared to second voice pattern data received at said communication channel interface in response to a second telephone call to a second telephone number tat is stored on said computer storage medium, wherein said first telephone number is different than said second telephone number, wherein a first predetermined response is performed in response to a match between said first extracted voice pattern data and said second voice pattern data, and wherein said first extracted voice pattern data is stored on said computer storage medium in response to a failure to match said first extracted voice pattern data to said second voice pattern data.

40. The apparatus of claim 39, further comprising a second computer storage medium, wherein said first extracted voice pattern data is stored on said second computer storage medium in response to a failure to match said first extracted voice pattern data to said second voice pattern data.

41. The apparatus of claim 39, further comprising:
a user output;
a user input, wherein a human operator is provided with said first extracted voice pattern data and third voice pattern data by said user output, and wherein said operator enters a predetermined response to a match between said third voice pattern data and a received extracted voice pattern data with said user input.

42. The apparatus of claim 39, wherein said first communication channel interface is interconnected to the public switched telephony network.

43. An outgoing call classification apparatus, comprising:
means for storing first voice pattern data received in response to an outgoing call to a first telephone number and in the absence of a special information tone;
means for receiving second voice pattern data in response to an outgoing call to a second telephone number, wherein said first telephone number is different than said second telephone number;
means for comparing said first voice pattern data to said second voice pattern data; and
means for storing said second voice pattern data in response to second voice pattern data that does not match said first voice pattern data.

44. The apparatus of claim 43, further comprising:
means for comparing said second voice pattern data to third voice pattern data;
means for providing at least one of said second voice pattern data and said third voice pattern data to a human operator if said means for comparing matches said second voice pattern data to said third voice pattern data;
means for associating a script prepared by said human operator with at least a portion of at least one of said second voice pattern data and said third voice pattern data; and
means for providing said script and associated voice pattern data to said means for storing.

45. A computer readable storage medium carrying instructions for performing a method, the method comprising:
comparing first voice pattern data received in response to a first call placed to a first telephone number to stored second voice pattern data received in response to a second call placed to a second telephone number, wherein said first and second voice pattern data are received in the absence of a special information tone, and wherein said first and second telephone numbers are not the same;
in response to detecting a match between said first voice pattern data and said second voice pattern data, performing instructions associated with said second voice pattern data; and
in response to failing to detect a match between said first voice pattern data and said second voice pattern data, storing said first voice pattern data.

46. The computer readable storage medium of claim 45, the method further comprising:
comparing said stored first voice pattern data to stored third voice pattern data; and
in response to detecting a match between said stored first voice pattern data and said third stored voice pattern data, providing at least one of at least a portion of said first voice pattern data and at least a portion of said third stored voice pattern data to a scripting agent, whereby instructions for responding to a detected a match between compared voice pattern data are prepared.

47. The computer readable storage medium of claim 46, wherein said scripting agent comprises a human operator.

48. The computer readable storage medium of claim 46, the method further comprising:
storing instructions prepared by said scripting agent, wherein said instructions are performed in response to detecting a match between fourth voice pattern data and said third stored voice pattern data.

49. The computer readable storage medium of claim 45, wherein said first voice pattern data is received from a computer storage medium.

50. The computer readable storage medium of claim 45, wherein said first voice pattern data is received from a switched circuit telephony network.

51. The computer readable storage medium of claim 45, wherein said stored second voice pattern data comprises an operator intercept message.

52. The computer readable storage medium of claim 45, the method further comprising:
prior to said step of comparing first voice pattern data to second voice pattern data, detecting first voice pattern data comprising an autovoice.

53. The computer readable storage medium of claim 52, wherein said autovoice comprises at least one of an operator intercept message and a number specific voice response.

54. The computer readable storage medium of claim 45, wherein said first voice pattern data is received as part of a telephone call, and wherein said step of comparing first voice pattern data to stored second voice pattern data is performed before said telephone call is disconnected.

55. The computer readable storage medium of claim 45, the method further comprising:
storing said first voice pattern data, wherein said first voice pattern data is received as part of a telephone call, and wherein said step of comparing first voice pattern data to stored second voice pattern data is performed after said telephone call is disconnected.

* * * * *